E. H. RYERSON.
HANDLE FOR KITCHEN UTENSILS.
APPLICATION FILED DEC. 30, 1918.

1,313,211.

Patented Aug. 12, 1919.

Witness
C. F. Messon.

Inventor
Eugene H. Ryerson.
By Attorneys
Southgate & Southgate.

UNITED STATES PATENT OFFICE.

EUGENE H. RYERSON, OF WORCESTER, MASSACHUSETTS, ASSIGNOR TO HAMBLIN & RUSSELL MANUFACTURING COMPANY, OF WORCESTER, MASSACHUSETTS, A CORPORATION OF MASSACHUSETTS.

HANDLE FOR KITCHEN UTENSILS.

1,313,211. Specification of Letters Patent. Patented Aug. 12, 1919.

Application filed December 30, 1918. Serial No. 269,006.

*To all whom it may concern:*

Be it known that I, EUGENE H. RYERSON, citizen of the United States, residing at Worcester, in the county of Worcester and State of Massachusetts, have invented a new and useful Handle for Kitchen Utensils, of which the following is a specification.

This invention relates to a handle for an egg whip or similar kitchen utensil.

The principal objects of the invention are to provide a neat and inexpensive manner of finishing the end of a wire-wound handle of such construction that there will be no separate ferrule or other part at the end that might get loose in practice; to provide a construction which will be open at the end so that any material inside can be washed out thoroughly and drained, and in which the entire exterior of the handle would preferably consist of a single piece of wire wound into position in such a simple way as to involve saving in the cost of manufacture; and to provide a more durable and sanitary device than has been the case heretofore.

Further objects and advantages of the invention will appear hereinafter.

Reference is to be had to the accompanying drawing, in which

Figure 1:
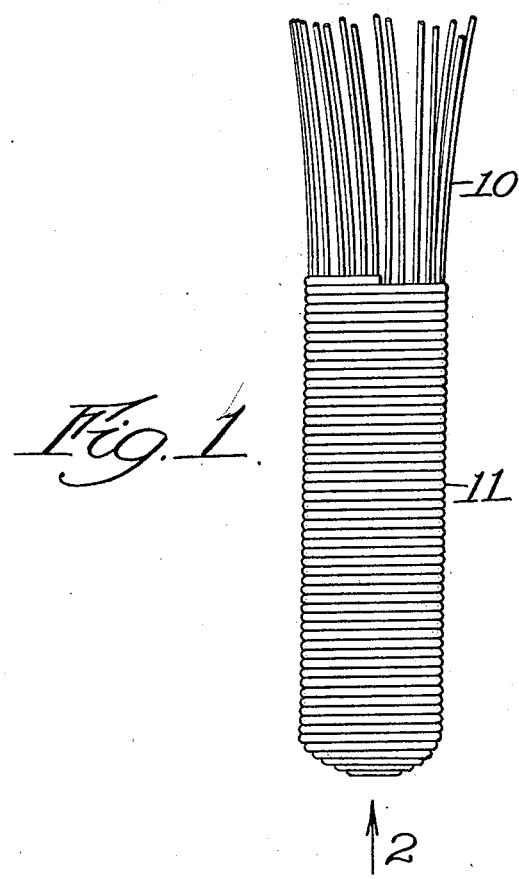
Figure 2:
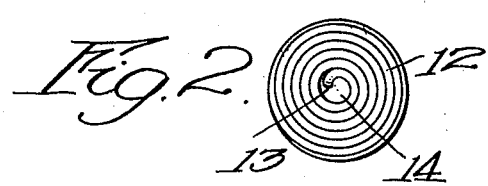

Figure 1 is an elevation of an egg whip provided with a handle constructed in accordance with this invention, and Fig. 2 is an end view of the handle.

This invention is designed to be applied to that type of kitchen utensil in which a metal handle is provided having a single coil of wire wound around its exterior to constitute its exterior surface. It has been customary heretofore to unite the convolutions of wire to each other and to the kitchen utensil itself by means of solder. Heretofore, so far as I am aware, the wire-wound part of the handle has been symmetrical throughout its length, and the end has been finished by placing a ferrule over it. This had to be manufactured and handled separately, and applied after the wire was wound and fixed in position, thus necessitating an additional operation for the attaching of the ferrule and fixing it in position on the handle. Also it was made closed at the end so that there was no way of cleaning out the hollow handle satisfactorily. This was particularly a bad feature for this type of kitchen utensil because it is used ordinarily for beating or whipping eggs, cream, etc.

According to this invention, the egg whip 10 is provided with the usual form of hollow wire-wound handle 11, formed by soldering the ends of the wires 10 on the exterior of a tin tube, not shown, and winding the wire 11 around that. This is secured by molten solder or the like in a form, preferably cylindrical, the only change being made in the way the end of the handle is finished. This is done in the present case by using more wire than heretofore, and instead of cutting it off at the end of the cylindrical portion continuing it beyond that and winding it into a coil 12, the convolutions of which gradually grow less owing to its spiral formation. The end 13 is bent back and forced inside.

In this way, an end is secured which is like the outside of the handle in that the convolutions of the wire are in contact throughout, and an opening 14 is provided at the center. Such a finish for a handle is easily made by the operator who makes the main part of the handle, requiring an almost unnoticeable addition of time, requiring no additional skill, eliminating the placing of any article or blank on the end and fastening it thereto, and also eliminating the removal of the handle from the form on which it is wound before it is finished. Furthermore, the entire handle can be firmly secured together by dipping in melted solder so that the several convolutions will be soldered together and form a continuous wall of alternate parts of solder and wire. This eliminates the tin ferrule usually used which sometimes gets loose and presents projecting cutting edges.

The opening in the end is a matter of importance also, because it permits the forcing of water into and through the hollow handle to remove any food particles which may get into it. A relatively strong construction is provided also because the convolutions of the handle at the end, being substantially in a plane transverse to the diameter of the main part of the handle and mutually supporting each other, act to keep the handle in cylindrical form. Thus it will be seen that this construction is an improvement over the prior art because it is less expensive to make, more durable, and more sanitary than has been the case heretofore.

Although I have illustrated and described only a single form of the invention and shown it as applied to only one kitchen article, I am aware of the fact that modifications can be made in these respects without departing from the scope of the invention as expressed in the claim. Therefore I do not wish to be limited to all the details or to the particular kitchen utensil herein shown and described, but what I do claim is—

As an article of manufacture, a handle for a kitchen utensil comprising a hollow wire-wound body having an end consisting of a series of convolutions of wire in contact with each other throughout and extending from the circumference of said body to a point near the center, and leaving a small opening in the center of the end for the admission and discharge of liquid to assist in the cleaning of the interior of the handle.

In testimony whereof I have hereunto affixed my signature.

EUGENE H. RYERSON.

Copies of this patent may be obtained for five cents each, by addressing the "Commissioner of Patents, Washington, D. C."